Oct. 9, 1923.
B. A. BEHREND
1,470,050
SPEED CHANGING MECHANISM
Filed April 18, 1923    9 Sheets-Sheet 4
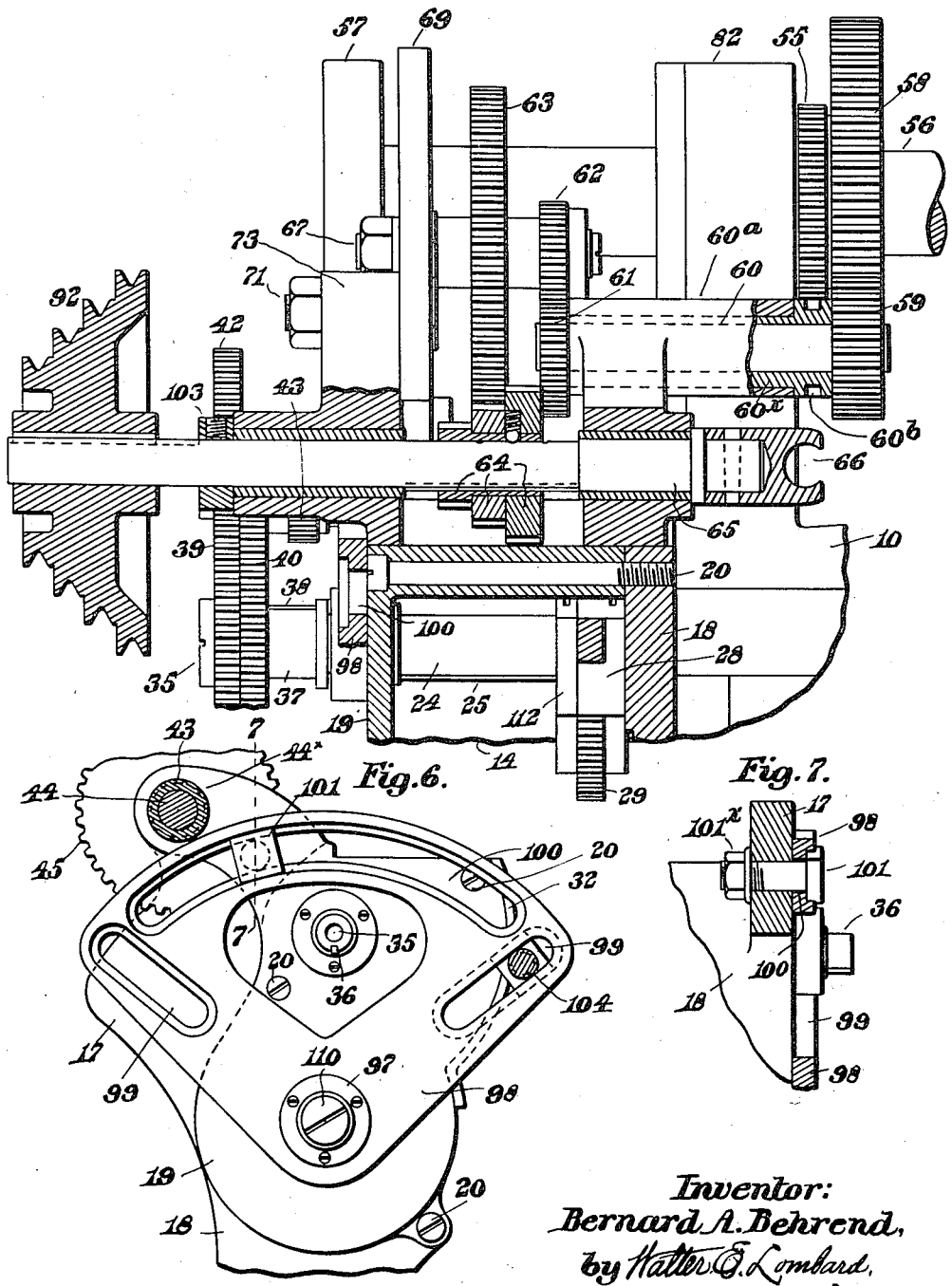
Inventor:
Bernard A. Behrend,
by Walter E. Lombard,
Atty.

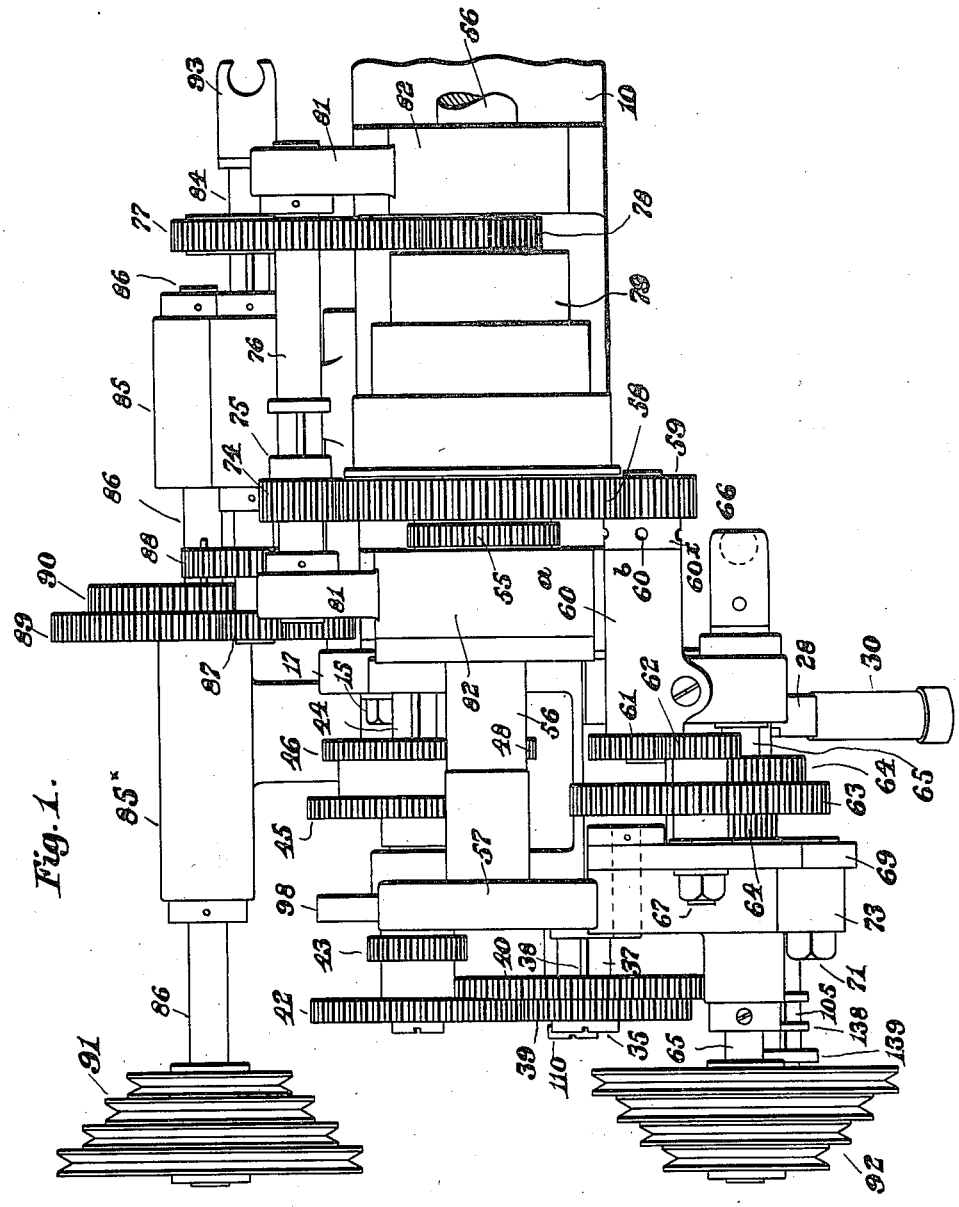

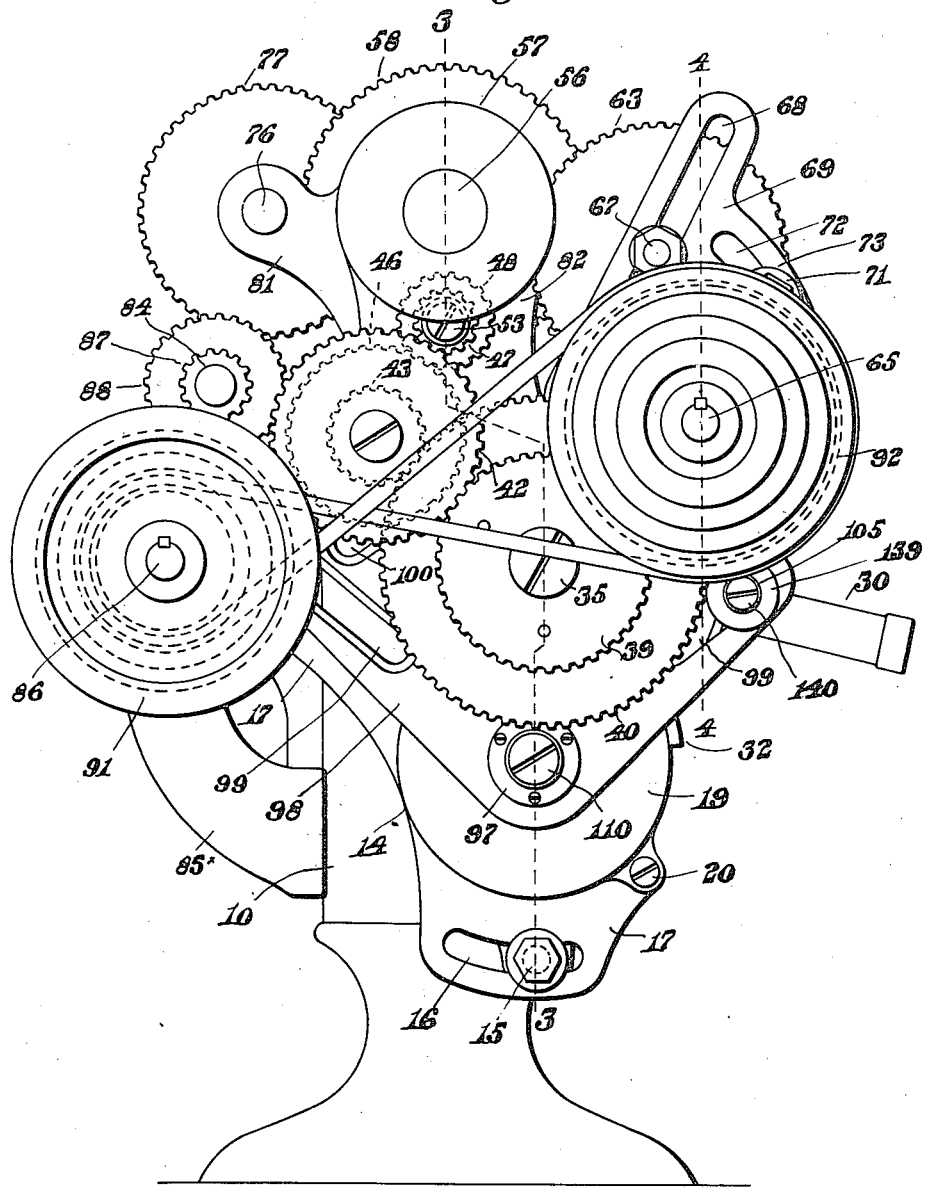

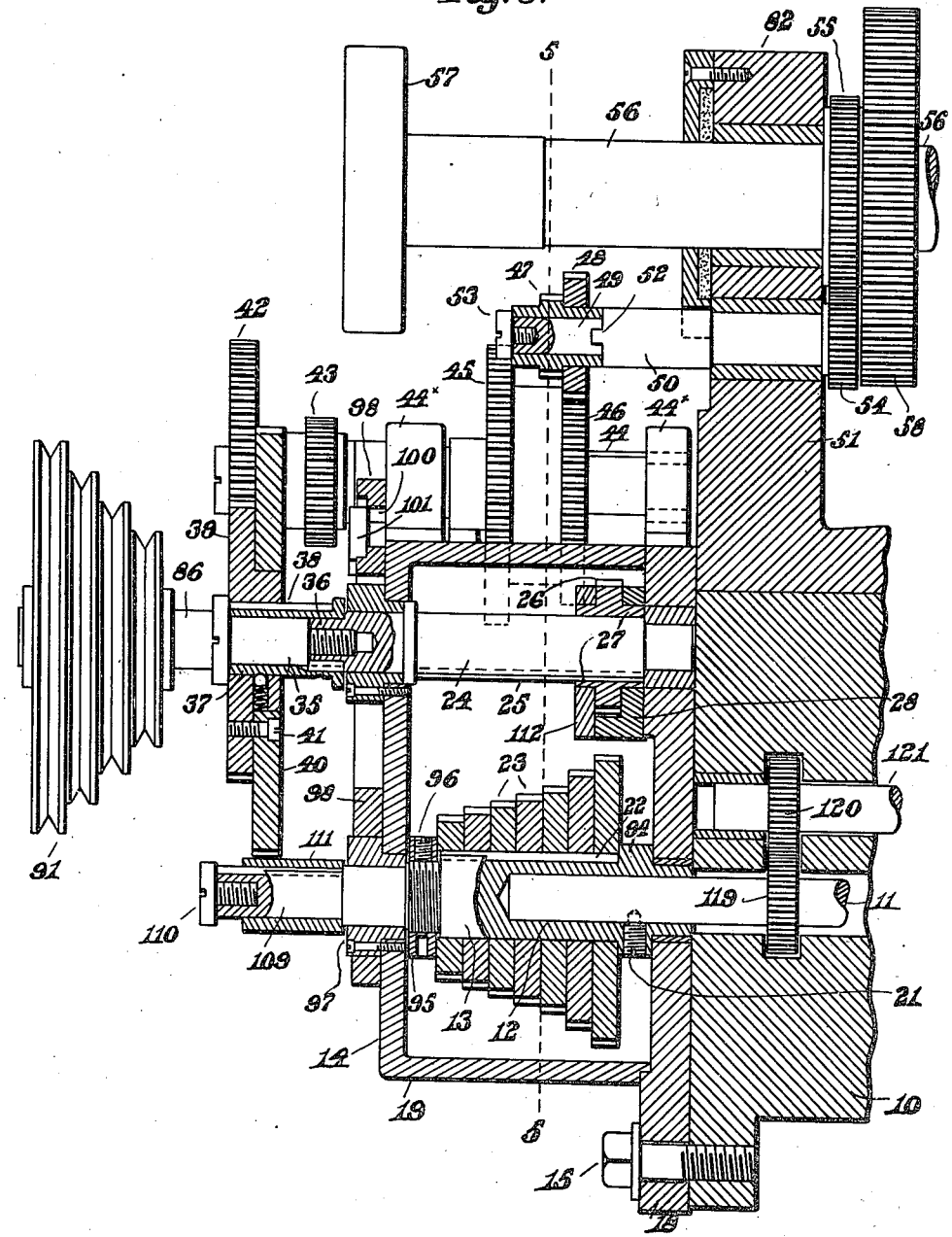

Oct. 9, 1923.

B. A. BEHREND 1,470,050

SPEED CHANGING MECHANISM

Filed April 18, 1923     9 Sheets-Sheet 5

Inventor:
Bernard A. Behrend,
by Walter E. Lombard,
Atty.

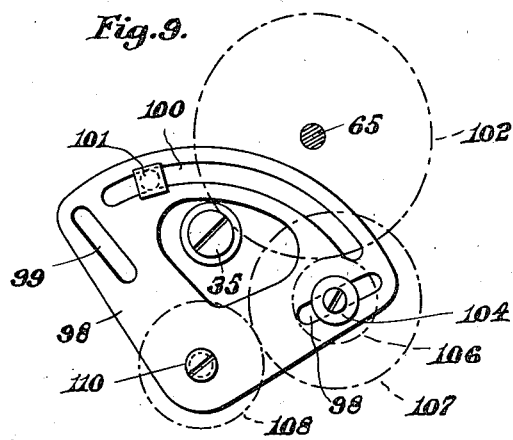
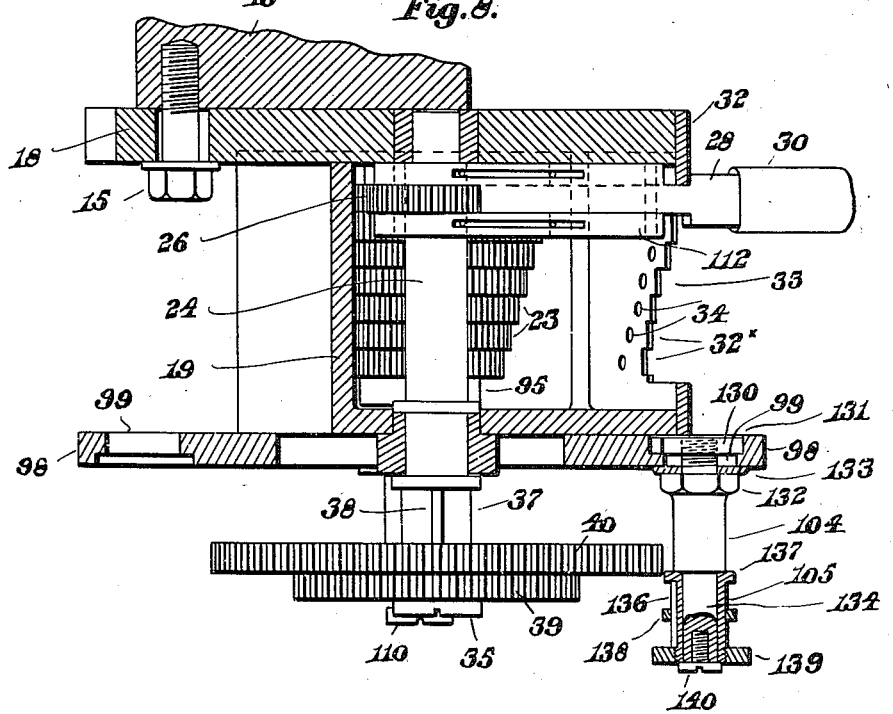
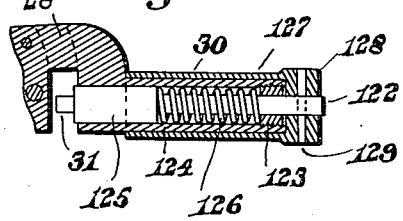

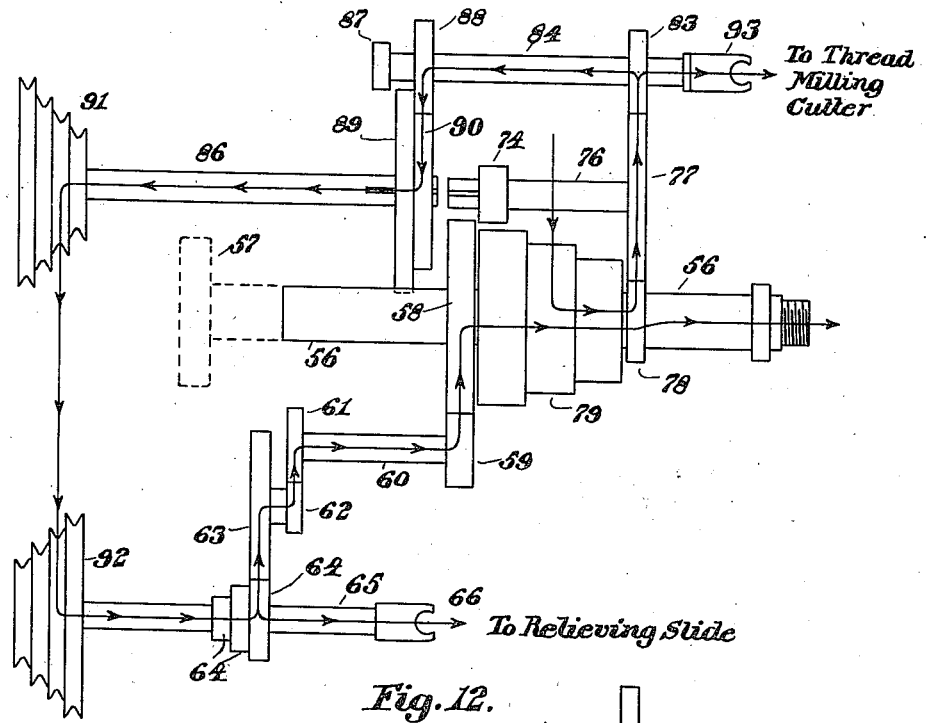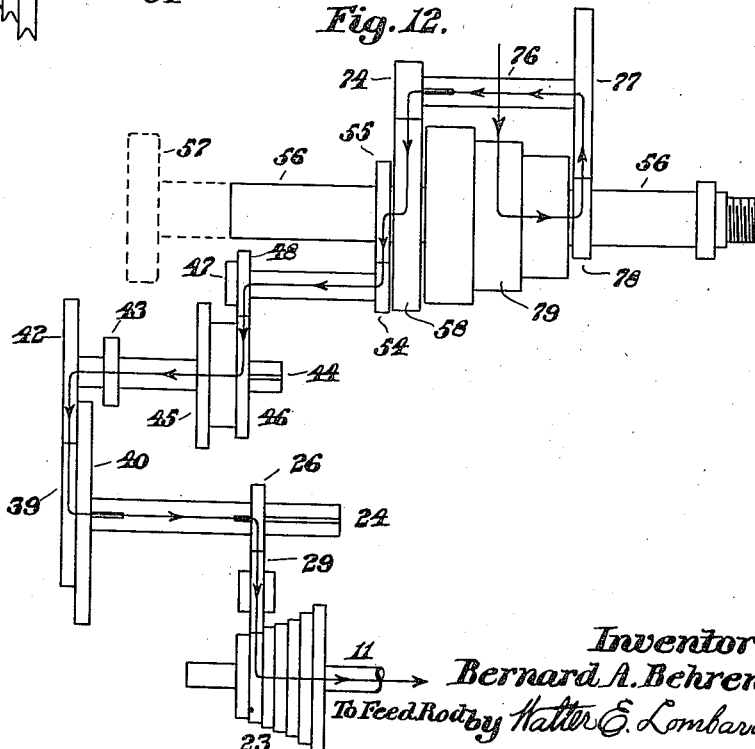

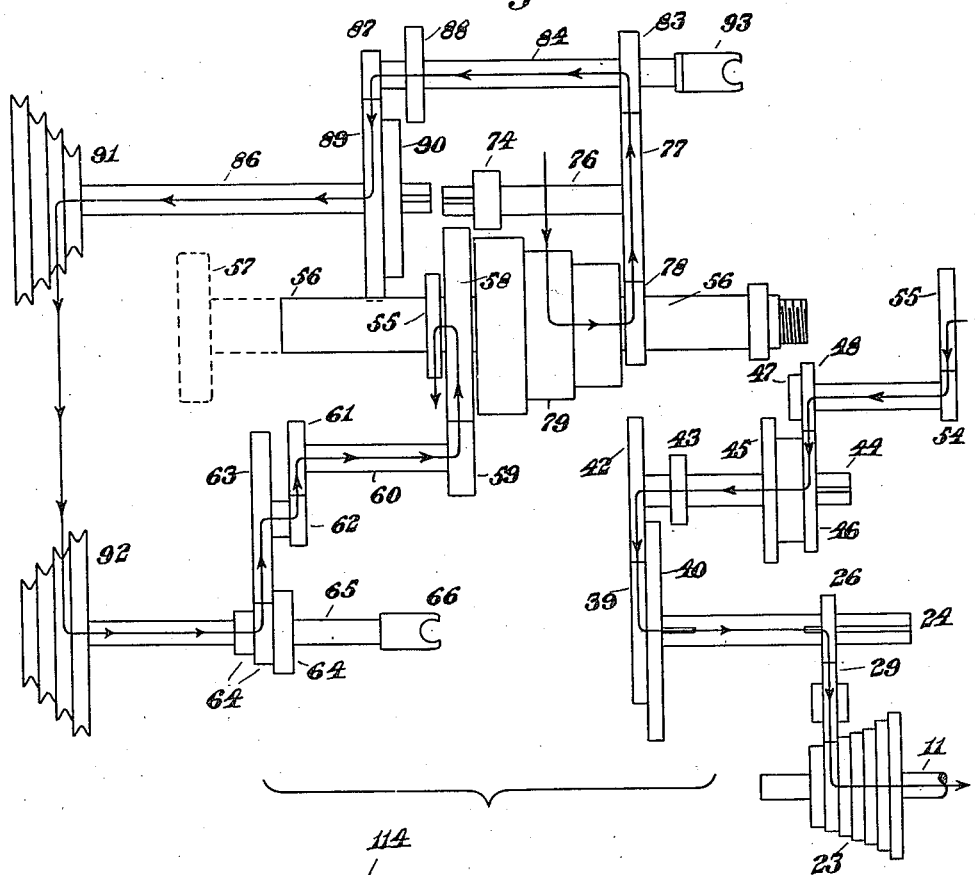
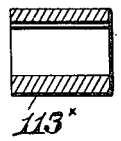
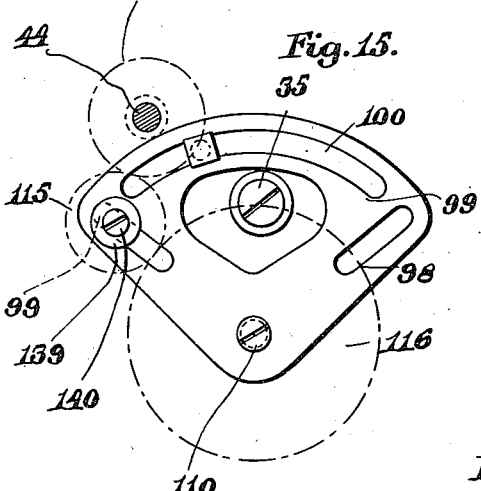
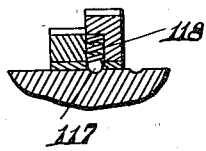

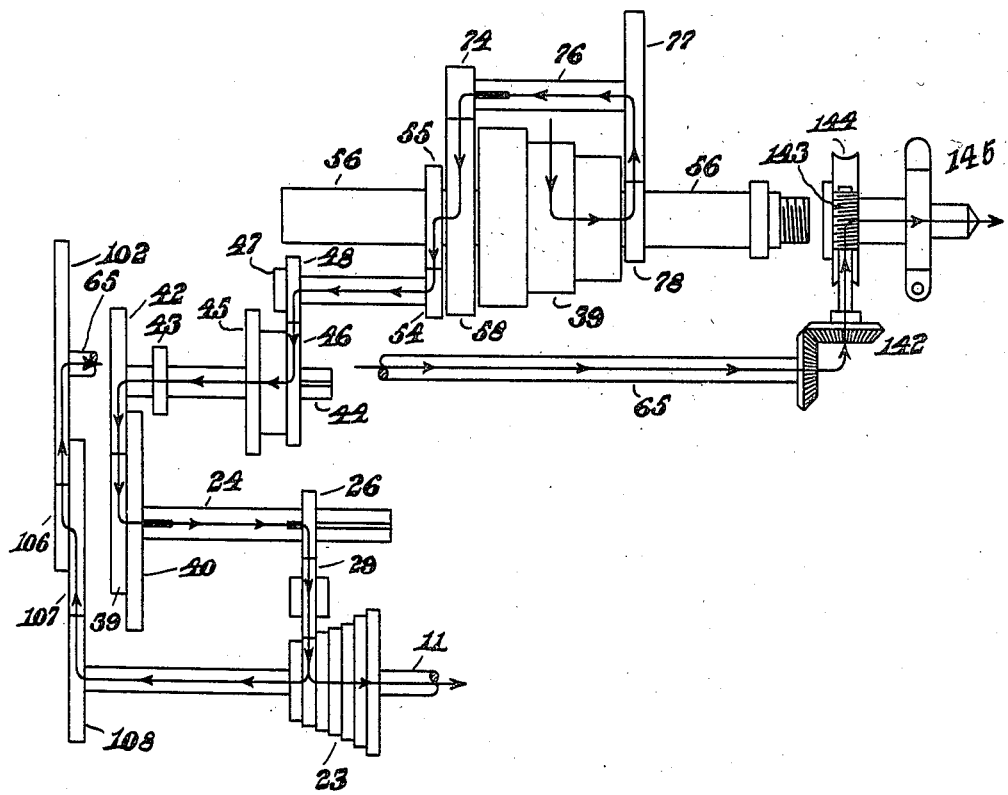

Patented Oct. 9, 1923.

1,470,050

UNITED STATES PATENT OFFICE.

BERNARD A. BEHREND, OF BROOKLINE, MASSACHUSETTS.

SPEED-CHANGING MECHANISM.

Application filed April 18, 1923. Serial No. 632,879.

*To all whom it may concern:*

Be it known that I, BERNARD A. BEHREND, a citizen of the United States of America, and a resident of Brookline, in the county of Norfolk and State of Massachusetts, have invented certain new and useful Improvements in Speed-Changing Mechanism, of which the following is a specification.

This invention relates to speed changing mechanism and particularly to a mechanism of this character which is especially adapted to be used for lathes on which it is desired to turn out exceedingly accurate work.

The object of the invention is to provide improved devices whereby various kinds of work may be performed and in which provision is made for quickly changing the ratio between the head stock spindle of the lathe and the lead screw or the feed rod connected thereto.

The invention consists primarily of a gear box containing gear mechanism for transmitting rotary movement from the lathe spindle to the feed rod, said box being adapted to be moved about the axis of said feed rod and locked in adjusted position.

The invention further consists in providing said gear box with a plurality of gear supporting brackets which may be moved with said gear box and also relatively thereto.

The invention further consists in suitable mechanism whereby the lathe may be used for plain screw chasing to obtain U. S. standard threads, metric threads, or special threads.

The invention further consists of devices for varying the connecting mechanism whereby the lathe may be used for thread milling to obtain U. S. standard, metric, or special threads.

The invention also consists of means for further varying the connecting mechanism whereby the lathe may be utilized for relieving cutters or hobs having either U. S. standard, metric, or special threads, or relieving spirals.

The invention further consists of means whereby the connecting mechanism may be adjusted to permit the use of the lathe for long lead spiral milling.

The invention further consists of certain novel features of construction and arrangement of parts which will be understood readily by reference to the description of the drawings and to the claims to be hereinafter given.

For the purpose of illustrating the invention, one preferred form thereof is shown in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings:

Figure 1 represents a plan of a speed changing mechanism embodying the principles of the present invention.

Figure 2 represents an end elevation of the same.

Figure 3 represents a vertical section of the same on line 3, 3 on Fig. 2, said figure being drawn to an enlarged scale.

Figure 4 represents a vertical section of a portion of the same on line 4, 4 on Fig. 2.

Figure 5 represents a vertical section of same on line 5, 5 on Fig. 3.

Figure 7 represents a section on line 7, 7 on Fig. 6.

Figure 8 represents a horizontal section of same on line 8, 8 on Fig. 5.

Figure 9 represents a sectional detail, showing the adjustable slotted plate for supporting special gears, one set of which is indicated by dotted pitch circles.

Figure 10 represents a section of the handle for actuating the tumbler gear.

Figure 11 represents a diagram showing the train of gears used when relieving cutters or hobs.

Figure 12 represents a diagram showing the train of gearing used for screw chasing U. S. standard threads.

Figure 13 represents a diagram showing the train of gearing used in thread milling U. S. standard threads.

Figure 14 represents a diagram showing the train of gearing used for long lead spiral milling.

Figure 15 represents a diagram showing the train of special gears used when chasing, milling, or relieving metric or special threads.

Figure 16 represents a sectional detail to be hereinafter referred to, and

Figure 17 represents a section of a spacer to be used as hereinafter specified.

Similar characters indicate like parts throughout the several figures of the drawings.

Figure 6:
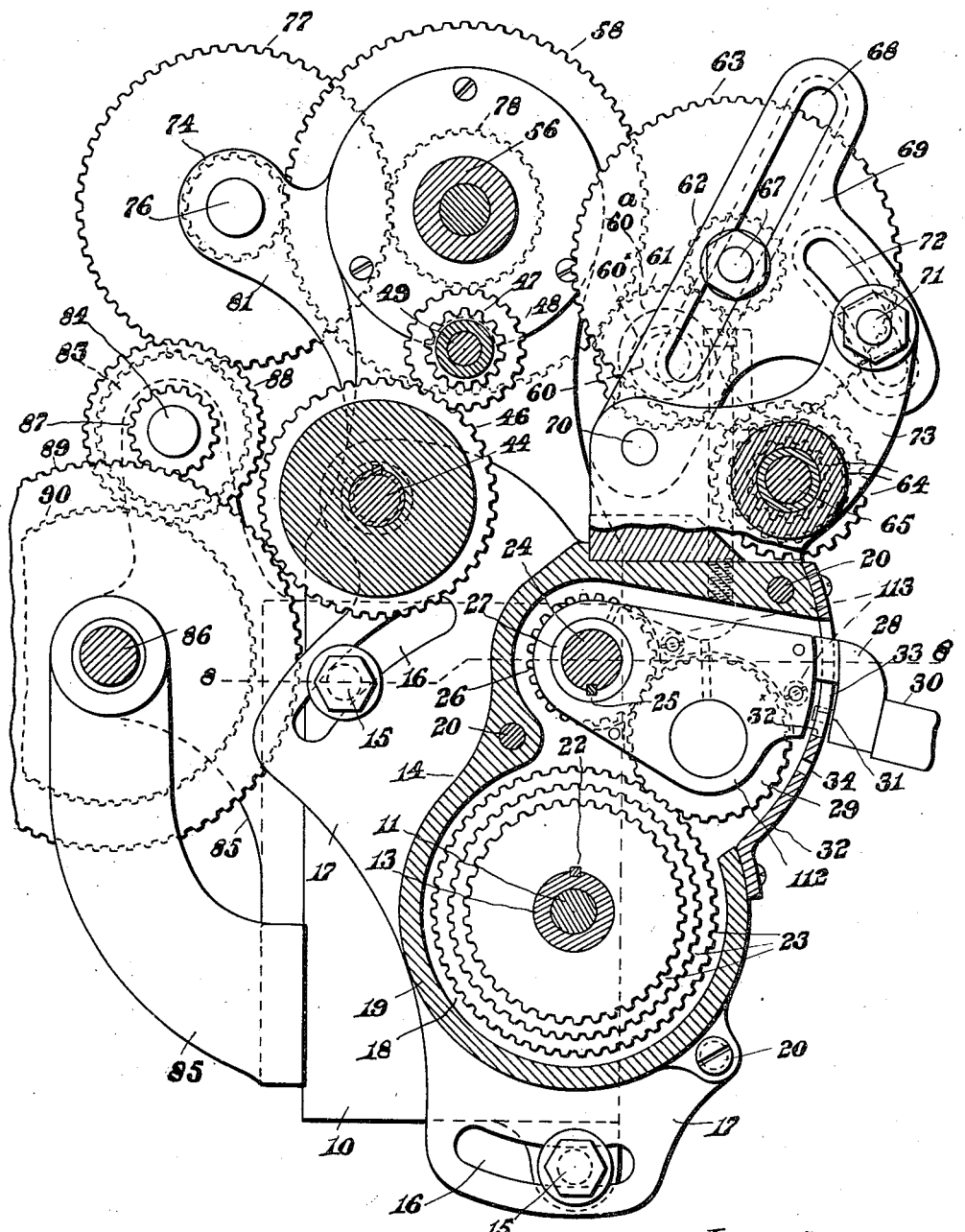
Figure 6 represents a sectional detail showing the adjustable slotted plate for supporting the special gears.

In the drawings, 10 is the bed of a lathe which may be of any well known construction and supported in any desired manner. This bed has mounted thereon and extending beyond the end thereof a feed rod 11, the projecting end of which extends into a socket 12 in a cylindrical member 13, which forms a pivotal support for a gear box 14, said gear box being movable about the axis of said cylindrical member 13 and feed rod 11, and clamped to the bed 10 by the bolts 15 extending through concentric slots 16 in ears 17 extending outwardly from said gear box.

The gear box is made in two parts, the plate 18, bearing against the end of the bed 10, and the chambered cover 19 secured to said plate 18 by means of bolts 20.

The cylindrical member 13 is locked to the feed rod 11 by means of the set screw 21 and has a key 22 extending longitudinally thereof and locking to said cylindrical member 13 a plurality of gears 23 of different diameters. While in the drawings, seven of these gears 23 are shown, it is obvious that a greater or lesser number may be used if desired.

Above the cylindrical member 13 and parallel therto is disposed a shaft 24 revoluble in bearings in the gear box 14, said shaft having a key 25 extending longitudinally thereof.

Mounted on said shaft 24 and keyed thereto is a gear 26, having oppositely disposed hubs 27, providing supports for a forked oscillating arm 28. This arm 28 is provided with bearings for an intermediate or tumbler gear 29 always in mesh with the gear 26 and adapted to brought into mesh with either one of the plurality of gears 23 by sliding the gear 26 longitudinally of the shaft 24 and then moving the arm 28 about the axis of said shaft 24 to bring the intermediate gear 29 into mesh with one of said plurality of gears 23.

The outer end of the arm 28 is provided with a handle 30 by which said arm may be oscillated, said handle 30 having contained therein a spring pressed locking bolt 31.

The front of the gear box 14 is provided with a closing plate 32 a portion of which is concentric to the axis of the shaft 24. This closing plate 32 has an opening 33 therein, the lower wall of which is provided with a plurality of steps 32ˣ corresponding in number to the number of the gears 23, and beneath each step is a cylindrical socket 34 adapted to receive the projecting end of the spring pressed locking bolt 31 to lock the arm 28 in any desired adjusted position whereby rotary movement may be transmitted from the shaft 24 through the gears 26 and 29 to either of the gears 23, thus providing a means for varying the speed of rotation of the feed rod 11.

The shaft 24 extends through the end of the gear box 14 and has a headed bolt 35 threaded thereto, a cylindrical portion of which forms an extension to a reduced end 36 on said shaft 24.

Surrounding this cylindrical portion of screw 35 and reduced end 36 is a sleeve 37 keyed to said reduced end 36 and revoluble therewith.

This sleeve 37 has a key 38 extending longitudinally thereof and keyed to the sleeve 37 is a gear 39, on the hub of which is a larger gear 40 secured to the gear 39 by bolts 41.

These gears 39 and 40 are adapted to transmit rotary movement to the shaft 24 and to slide lonitudinally of said sleeve 37 so that the gear 39 may mesh with the gear 42, or the gear 40 mesh with the gear 43.

These gears 42 and 43 are keyed to the shaft 44 revolubly mounted in bearings 44ˣ on the gear box 14. The gears 39, 40, 42, and 43 may be removed from their shafts and other gears substituted therefor when it is desired to do special work on the lathe.

The shaft 44 has also slidably mounted thereon and keyed thereto the gears 45 and 46. The gear 45 is the same diameter as the gear 42 and is adapted to mesh with the pinion 47, while the smaller gear 46 when moved longitudinally of the shaft 44 may be brought into mesh with the pinion 48.

The pinion 48 is secured to and revolves with the hub of the pinion 47 about the reduced end 49 of a short shaft 50 mounted in bearings in the end wall 51 of the frame of the lathe.

The hub of the pinion 47 is provided with locking notches into which project the lugs 52 on the short shaft 50, said pinion 47 being held in position by means of the headed bolt 53.

The opposite end of the short shaft 50 has secured thereto a gear 54 adapted to be driven by means of a gear 55 secured to and revoluble with the lathe spindle 56.

At the outer end of the spindle 56 is disposed a hand wheel 57, the hub of which is threaded in the usual manner to the shank of a work-holding chuck which may be of any well known construction.

By rotating the handle 57, the shank is moved endwise and actuates the gripping fingers of the chuck.

It is believed to be unnecessary to illustrate this and other details of construction of the lathe, as they form no part of the present invention.

The lathe spindle 56 has secured thereto a gear 58 which meshes with a gear 59 on a shaft 60, the opposite end of which has secured thereto a gear 61 meshing with a pinion 62 revoluble with a gear 63, said gear 63 being adapted to mesh with either one of three gears 64, which are of different diameters and slidably mounted upon the drive shaft 65 of a relieving slide such as is generally used on lathes of this character, the driving shaft of said relieving slide being adapted to be connected by a universal connection to the member 66 pinned to the end of said drive shaft 65.

When the relieving slide is not in use, the above-described mechanism may be used to provide many changes in speed being transmitted from the spindle 56.

The gear 63 and pinion 62 are mounted upon a stud 67 adapted to be moved longitudinally of the slot 68 formed in the plate 69 and clamped thereto in adjusted position when it is desired to have the gear 63 mesh with either one of the gears 64.

This plate 69 is pivoted at 70 to the gear box 14 and is adapted to be locked in adjusted position by means of the bolt 71 extending through a slot 72 in said plate and mounted in an ear 73 extending upwardly from the top of the gear box 14.

The shaft 60 is mounted in a bushing 60ˣ eccentrically mounted in the hub 60ᵃ, and provided at one end with means such as the spanner holes 60ᵇ, whereby it may be adjusted about its axis so that the teeth of the gear 61 may be brought into mesh with the teeth of the pinion 62 when the stud 67 is adjusted in the slot 68 so that the gear 63 will mesh with either of the gears 64 of different diameters, it being necessary to adjust the plate 69 also about its pivot 70 to bring the gears 59 into proper mesh with the gear 58.

When the proper adjustments have been made of the eccentric bushing 60ˣ, stud 67 and plate 69, said plate is then clamped to the frame by the clamp bolt 71.

By means of this construction, the gear 63 may be thrown into or out of commission as desired, in order to accommodate the mechanism for varying classes of work, or it may be adjusted so that it will drive either of the three gears 64 and thereby vary the speed of rotation of the shaft 65.

The gears 42 and 43 are normally upon the shaft 44 in the position shown in the drawings, with the teeth of gear 39 meshing with those of gear 42, and, as has been described hereinbefore, by sliding gears 39, 40 on the bushing 37, the gears 40, 43 may be brought into mesh, thus giving a variation in the speed being transmitted from shaft 44 to shaft 24.

The mechanism is so constructed that the gears 39, 40 may be removed from the sleeve 37 and placed upon the shaft 44, and the gears 42, 43 may likewise be removed from shaft 44 and placed upon the sleeve 37.

When these changes have been made, two further variations in speed are provided; that is, by transmitting rotary movement from gear 39 on shaft 44 to the gear 42 on sleeve 37, or by transmitting the movement from gear 40 on shaft 44 to the gear 43 on sleeve 37.

The gear 58 secured to the spindle 56 also meshes with the pinion 74, mounted on the sleeve 75 keyed to and slidable lengthwise of a shaft 76 which has a gear 77 secured to the other end thereof, meshing with a gear 78 secured to and revoluble with the cone pulley 79 loosely mounted upon the spindle 56. The gear 74 may be moved along the shaft 76 until it is out of mesh with the gear 58 so that no rotary movement will be imparted to the gear 58 from the gear 78 under certain conditions.

The shaft 76 is revoluble in ears 81 extending rearwardly from the supports 82 extending upwardly from the frame of the lathe.

The gear 77 meshes with the gear 83 on the shaft 84 revolubly mounted in bearings in a bracket 85 on the rear of the frame, this bracket 85 also having a bearing for a shaft 86.

The shaft 84 has secured thereto two pinions 87 and 88, mounted upon the same hub. The pinion 87 is adapted to mesh with gear 89 slidably mounted upon and keyed to the shaft 86, said gear 89 having secured thereto a gear 90, and by moving the gears 89, 90 lengthwise of the shaft 86 said pinion 87 may be disengaged from the gear 89 and the pinion 88 brought into mesh with the gear 90.

The outer end of the shaft 86 has mounted thereon a cone pulley 91 from which power may be transmitted through a belt of any well known construction to the cone pulley 92 on the drive shaft 65.

The shaft 86, besides having a bearing in the bracket 85, also has a bearing in the bracket 85ˣ secured to the rear face of the lathe bed 10.

The shaft 84 is provided with a universal joint connection 93, adapted to be connected to a driving shaft for actuating the usual cutter head when the machine is being used for thread milling.

The cylindrical member 13 is provided with a peripheral flange 94 against one face of which the plurality of gears 23 are held by the clamping nut 95 threaded to said member 23 and retained in adjusted position by means of the set screw 96.

The outer end of the cylindrical member 13 rotates in a bushing 97 secured by bolts to the cover 19 of the gear box 14, and supported upon the flange of said bushing 97 is a plate 98 provided with radial slots 99 and a concentric slot 100.

This plate 98 may be moved about the axis of the cylindrical member 13 and secured in any desired position by means of the headed bolt 101 extending through the ear 17 forming a part of the gear box 14, and provided with a clamping nut 101$^x$ on its projecting end.

The object of this plate 98 is to provide a means for mounting a plurality of special gears thereon when it is desired to cut special threads and cutting long leads.

When it is desired to cut long leads, the gears 42, 43, 39 and 40 are removed and another gear 102 is placed upon the shaft 65 between the pulley 92 and the collar 103 and keyed thereto.

In one of the radial slots 99 is adjustably positioned a stud 104 having a sleeve 105 revolubly mounted thereon and to this sleeve 105 are keyed a pinion 106 and gear 107.

The pinion 106 meshes with the gear 102 and transmits rotary movement from said gear 102 to the gear 107.

The gear 107 meshes with a gear 108 keyed to the reduced end 109 of the member 13, said gear 108 being retained in position on said reduced end by means of the headed screw 110, while the spacer 111 retains it in the same plane as the gear 107.

The arm 28 is provided with a removable plate 112 to facilitate the assembling of the gears 26 and 29 in the forked portion thereof, this plate 112 being secured to the arm 28 by means of bolts 113.

When it is desired to cut metric threads, the gears 42, 43 are removed from the end of the shaft 44 and gears 39, 40 are pushed back on the sleeves 37 and locked thereto.

A spacer 113$^x$ (see Fig. 17) is then placed on the shaft 44 and outside of this is placed a special gear 114 adapted to mesh with a special gear 115 revolubly mounted on the stud 104 mounted on the plate 97. This gear 115 meshes with a gear 116 keyed to the reduced end 109 of the member 13 and rotates the feed rod 11.

At this time, the gears 23, 26, and 29 are out of commission.

Wherever a gear is made slidable upon a shaft, it is locked in its adjusted position by means of a spring pressed ball 117 which is acted upon by the spring 118 to cause a portion of the ball to enter an indentation in the periphery of the shaft on which the gear is mounted, all as shown in Fig. 16.

The feed rod 11 extends along the bed 10 of the lathe and has a gear 119 thereon meshing with a gear 120 mounted upon and adapted to rotate the lead screw 121, which in its rotation is adapted to reciprocate the tool supporting carriage lengthwise of the bed. As this carriage may be of any well known construction, it need be neither shown nor described herein.

The locking bolt 31 in the handle 30 has a reduced shank 122 extending through a nut 123 threaded to the interior of the tubular extension 124 and between this nut 123 and the enlarged portion 125 of the bolt 31 is a spring 126, the tension of which may be regulated by adjusting the nut 123.

The extension 124 is surrounded by the cylindrical portion 127 of a slidable member 128 in the outer end of which the shank 122 is secured by the pin 129. This slidable member 128 may be moved outward by the operator to withdraw the bolt 31 from a socket 34 against the tension of the spring 126, and as soon as the member 128 is released it will return to its normal position as shown in Fig. 10.

The stud 104 may be secured in adjusted position in the slot 99 of plate 98 in any well known manner, as for instance as shown in Fig. 9, in which 130 is a flat sided nut positioned in a depressed portion 131 of the slot 99 and prevented from turning by the walls of said depression.

The bolt 104 is provided with means for rotating it and screwing it into said nut 130, this means as shown being the hexagonal portion 132 between which and the face of the plate 98 is a friction washer 133.

The outer end of the stud 104 is reduced in diameter as indicated at 134 and on this reduced portion is a revoluble sleeve 105, having a key 136 extending lengthwise of its periphery.

The sleeve 105 is provided with a flange 137 between which and a collar 138 may be positioned the gear 107, while on the outer end of said sleeve may be positioned the gear 106, both of said gears being adapted to rotate with the sleeve 105.

A disk nut 139 is threaded to the outer end of the sleeve 135, this disk retaining the gears in position on said sleeve.

The sleeve 105 is retained upon the reduced portion 134 by means of the head of the screw 140 threaded to the end of the stud 104, all as shown in Fig. 8.

By the construction of speed changing mechanism herein shown and described, it is obvious that a great variety of speeds are obtainable and the device is readily adapted to perform many kinds of work.

With the shaft 24 rotated at a given speed by the gears 42, 39, the cylindrical member 13 may be rotated at seven different speeds by moving the tumbler gear 29 in such manner as to form a driving connection between the gear 26 and either of the gears 23.

By shifting the gears 39, 40, so that the gear 43 will engage the gear 40 and making the same adjustment of the tumbler gear 29, seven other speeds are obtainable.

By changing the gears 42, 43, to the sleeve 37, and the gears 39, 40 to the shaft 44, fourteen other variations in speed can be provided or twenty-eight different speeds in all.

If further change of speed of the cylindrical member 13 is desired, the gears 45, 46 may be shifted so that the gear 45 will mesh with pinion 47 and the number of changes will be doubled so that the feed rod 11 may be driven from the spindle 56 through gears 55, 54, at fifty-six different speeds.

By dispensing with the gears 39, 40, 42, 43, and substituting therefor the train of gearing 114, 115, and 116, shown in Fig. 15, said feed rod 11 may be driven at another speed when the gears 46, 48 are in mesh, and still another when the gears 45, 47 are in mesh.

In the train of gears 114, 115 and 116, gears of different pitch circles may be used, thereby causing further variations in the speed of the feed rod, 11.

When for any particular work, the feed rod 11 is not required, the gear box 14 may be moved about the pivot 13 disengaging the gears 39, 40 from the gears 42, 43 so that no rotary movement will be transmitted from the shaft 44 to said feed rod 11.

When the mechanism is to be used in thread relieving, the various elements are connected in the manner shown in Fig. 11.

The cone pulley 79 is driven by a suitable belt (not shown) and the rotary movement thereof is transmitted to the shaft 84 through the medium of gears 78, 77, 83.

This shaft 84 at one end is connected by member 93 to a shaft for actuating a thread milling cutter of any well known construction.

A gear 88 on the opposite end of said shaft 84 meshing with gear 90 rotates the shaft 86 on the end of which is mounted a cone pulley 91 connected by a belt to a cone pulley 92 on the shaft 65, the opposite end of which is provided with a connection 66 adapted to be coupled with a shaft for actuating a relieving slide of any usual construction. By changing the belt to the various grooves of the cone pulleys 91, 92, four variations in speed are secured as rotary movement is imparted to the shaft 65 and this number of changes may be doubled by shifting the gears 89, 90 so that the former will mesh with the gear 87.

By means of the three gears 64 on shaft 65, three changes of speed may be transmitted through gears 63, 62, and 61 to the shaft 60 on one end of which is a gear 59 meshing with a gear 58 on the spindle 56.

By this means, the spindle 56 may be driven at twenty-four different speeds.

During the thread milling operation, the gear 74 will be out of commission.

When the screw chasing operation is to be performed, U. S. standard threads, the rotation of the cone pulley will be transmitted to the shaft 76 through the gears 78, 77, and as the gear 74 is at this time in mesh with the gear 58, rotary movement will be imparted to the spindle 56 and through the gears 55, 54, to the gear 48, which in turn drives the gear 46 on the shaft 44.

The rotation of the shaft 44 will be transmitted to the feed rod 11 through the train of gears 42, 39, 26, 29 and 23, as hereinbefore described.

When the mechanism is to be used for thread milling, U. S. standard threads, the various elements are connected as shown in Fig. 13 and at this time the gear 74 is out of commission.

The rotation of cone pulley 79 is transmitted to the spindle 56 in precisely the same manner as in thread relieving through the medium of gears 78, 77, 83, 87, 89, pulleys 91, 92, and gears 64, 63, 59, and 58.

The gear 55 rotates with the gear 58 and transmits rotary movement to the feed rod through the medium of the gears 54, 48, 46, 42, 39, 26, and 29.

When the mechanism is to be used for long lead spiral milling, the various elements are in the positions shown in Fig. 14.

During this operation, the gear 74 is in operation and the rotary movement of the cone pulley 79 will be transmitted to the feed rod 11 through the gears 78, 77, 74, 58, 55, 54, 48, 46, 42, 39, 26, 29, and 23.

The shaft 19 is rotated by the gear 23 and drives a special gear 108, meshing with gear 107 on the revoluble sleeve 105 on stud 104, said sleeve having keyed thereto the gear 106 meshing with the gear 102 on the shaft 65.

This shaft 65 has a bevel gear 141 on the end thereof meshing with a bevel gear 142 on a worm 143 meshing with a worm gear 144 driving a spiral head 145 which may be of any well known construction.

In any of the above-mentioned operations, where metric threads are to be produced or operated upon, the intermediate gear 29 is placed in neutral position and the feed rod 11 is driven directly from the shaft 44 by means of the gears 114, 115, and 116 hereinbefore described.

In case special threads are desired, the train of gears 114, 115, 116 are made special with the required number of teeth to accomplish the particular result desired, the gears 23, 26, 29 being out of commission at this time.

As the gear box 14 is movable about the cylindrical member 13, it is obvious that it may be locked in the position shown in Figs. 2 and 5 with the gears 46, 48 in mesh, or it may be moved about the axis of member 13 into new positions so that said gear 46 will mesh with the gear 47 or the gear 45 be brought into mesh with either the gear 47 or 48.

It is obvious that when these changes are to be made, the gears 45, 46 must be moved lengthwise of shaft 44 to bring into the same plane the pair of gears it is desired to mesh.

By performing this operation, the number of changes in speed to be transmitted to the various actuating shafts and the work spindle is materially increased.

This provision of means whereby the gear box may be moved about the axis of the feed rod so that the gears 45, 46 carried thereby may be brought into mesh with the driving gears 47, 48 in a variety of different ways, is of great advantage, for the changes in speed produced by other instrumentalities at other points are greatly multiplied thereby.

Having thus described my invention, I claim:

1. The combination of a feed rod; a gear box adjustable about the axis thereof; a spindle; rotating means therefor; and a system of gearing on and within said gear box connecting said spindle and feed rod.

2. The combination of a gear box; a revoluble shaft therein having a socket in one end; a feed rod having an end thereof locked in said socket; a plurality of gears of different diameters keyed to said shaft; a second shaft parallel to said revoluble shaft; a gear keyed to said second shaft and slidable lengthwise thereof; an oscillating arm movable about the axis of said second shaft and slidable with said slidable gear; an intermediate gear on said arm for transmitting rotary movement from said slidable gear to either of said plurality of gears on the revoluble shaft; a spindle; and a train of gears between said spindle and said second shaft to impart rotary movement thereto.

3. The combination of a gear box; two revoluble shafts revoluble in bearings therein a feed rod connected to and revolved by one of said shafts; a sleeve keyed to and revoluble with the second shaft; means within the box for transmitting rotary movement at varying ratios of speed from the second shaft to the first mentioned shaft; two gears of different diameters slidable upon said sleeve and revoluble therewith; a third shaft revoluble in bearings in said box; gears thereon of different diameters, either of which is adapted to mesh with one of said slidable gears; a spindle; and a train of gearing between said third shaft and said spindle.

4. The combination of a gear box; two revoluble shafts revoluble in bearings therein; a feed rod connected to and revolved by one of said shafts; a sleeve keyed to and revoluble with the second shaft; means within the box for transmitting rotary movement at varying ratios of speed from the second shaft to the first mentioned shaft; two gears of different diameters slidable upon said sleeve and revoluble therewith; a third shaft revoluble in bearings in said box; gears thereon of different diameters either of which in adapted to mesh with one of said slidable gears; a spindle; a fourth shaft having pinions of different diameters secured thereto; gears of different diameters slidably mounted upon and revoluble with said third shaft and either of which is adapted to mesh with one of the pinions; and driving connections between said spindle and fourth shaft.

5. The combination of a feed rod; a lead screw; driving connections between said rod and screw; a driving shaft for said rod in alinement therewith; a plurality of gears of different diameters on said shaft; and driving mechanism adapted to be connected to either of said gears.

6. The combination of a feed rod; a lead screw; driving connections between said rod and screw; a driving shaft for said rod in alinement therewith; a plurality of gears of different diameters on said shaft; driving mechanism adapted to be connected to either of said gears; and means independent of said driving mechanism and plurality of gears for imparting rotary movement to said feed rod shaft.

7. The combination of a feed rod; a lead screw; driving connections between said rod and screw; a driving shaft for said rod in alinement therewith; a plurality of gears of different diameters on said shaft; driving mechanism adapted to be connected to either of said gears; and means, removably mounted on said driving shaft and independent of said driving mechanism and plurality of gears for imparting rotary movement to said feed rod shaft.

8. The combination of a feed rod; a lead screw; driving connections between said rod and screw; a driving shaft for said rod in alinement therewith; a plurality of gears of different diameters on said shaft; a second shaft; a driving gear slidably mounted thereon and revoluble therewith; an intermediate gear meshing with said driving gear and slidable therewith and movable about the axis of said gear to mesh with either of said plurality of gears; an arm on which said intermediate gear is mounted; a box containing said mechanism and having a stepped opening through which said arm extends and a socket opposite each step; and a spring pressed bolt carried by said arm adapted to enter a socket when said arm is on a step.

9. The combination of a revoluble spindle; a driving pulley loosely mounted thereon; a gear revoluble therewith; a revoluble shaft parallel to said spindle; a gear on one end thereof meshing with the pulley gear; a gear on the opposite end of said shaft; a gear on the spindle adapted to mesh with the last mentioned gear; a feed rod; and a train of gearing for transmitting rotary movement from the spindle gear to said feed rod.

10. The combination of a revoluble spindle; a driving pulley loosely mounted thereon; a gear revoluble therewith; a revoluble shaft parallel to said spindle; a gear on one end thereof meshing with the pulley gear; a gear slidably mounted on the opposite end of said shaft and adapted to be moved into and out of commission; a gear on the spindle adapted to mesh with the last mentioned gear; a feed rod; and a train of gearing for transmitting rotary movement from the spindle gear to said feed rod.

11. The combination of a revoluble spindle; means for rotating said spindle; a driving pulley loosely mounted on said spindle; a gear revoluble therewith; a shaft parallel with said spindle adapted to actuate a thread milling cutter; means for rotating said shaft from the pulley gear; a gear on said shaft; a second shaft adapted to be rotated by said gear; a pulley thereon; a shaft for actuating a relieving slide; and means for rotating said relieving-slide-actuating shaft from said pulley.

12. The combination of a revoluble spindle; means for rotating said spindle; a driving pulley loosely mounted on said spindle; a gear revoluble therewith; a shaft parallel with said spindle adapted to actuate a thread milling cutter; means for rotating said shaft from the pulley gear; two gears of different diameters on said shaft; a second shaft adapted to be rotated by either of said gears; a pulley thereon; a shaft for actuating a relieving slide; and means for rotating said relieving-slide-actuating shaft from said pulley.

13. The combination of a revoluble spindle; a driving pulley loosely mounted thereon; a gear revoluble therewith; a shaft parallel with said spindle adapted to actuate a thread milling cutter; means for rotating said shaft from the pulley gear; a gear on said shaft; a second shaft adapted to be rotated by the last mentioned gear; a third shaft adapted to actuate a relieving slide; driving connections between said second and third shafts; a gear secured to said spindle; and a train of gears between said thread milling cutter; means for rotating said spindle.

14. The combination of a revoluble spindle; a driving pulley loosely mounted thereon; a gear revoluble therewith; a shaft parallel with said spindle adapted to actuate a thread milling cutter; means for rotating said shaft from the pulley gear; a gear on said shaft; a second shaft adapted to be rotated by the last mentioned gear; a third shaft adapted to actuate a relieving slide; driving connections between said second and third shafts; a gear secured to said spindle; and a train of interchangeable gears between said third shaft and spindle gear for rotating said spindle at different speeds relatively to the speed of said third shaft.

15. The combination of a revoluble spindle; a driving pulley loosely mounted thereon; a gear revoluble therewith; a shaft parallel with said spindle adapted to actuate a thread milling cutter; means for rotating said shaft from the pulley gear; a gear on said shaft; a second shaft adapted to be rotated by the last mentioned gear; a third shaft adapted to actuate a relieving slide; a plurality of gears of different diameters on said third shaft; a gear adapted to be brought into mesh with either of said plurality of gears; a train of gears actuated thereby; and a gear secured to said spindle rotatable by one of said train of gears.

16. The combination of a revoluble spindle; a driving pulley loosely mounted thereon; a gear revoluble therewith; a shaft parallel with said spindle adapted to actuate a thread milling cutter; means for rotating said shaft from the pulley gear; a gear on said shaft; a second shaft adapted to be rotated by the last mentioned gear; a third shaft adapted to actuate a relieving slide; driving connections between said second and third shafts; a gear secured to said spindle; a train of gears between said third shaft and spindle gear for rotating said spindle; a second gear rotatable with said spindle; a feed rod; a plurality of gears of different diameters thereon; and a train of gears driven by said second spindle gear and adapted to rotate said feed rod through the medium of either of the gears thereon.

17. The combination of a revoluble spindle; a driving pulley loosely mounted thereon; a gear revoluble therewith; a shaft parallel with said spindle adapted to actuate a thread milling cutter; means for rotating said shaft from the pulley gear; a gear on said shaft; a second shaft adapted to be rotated by the last mentioned gear; a third shaft adapted to actuate a relieving slide; driving connections between said second and third shafts; a gear secured to said spindle; a train of gears between said third shaft and spindle gear for rotating said spindle; a second gear rotatable with said spindle; a feed rod; a plurality of gears of different diameters thereon; a fourth shaft; a driving gear keyed to and slidable lengthwise of said fourth shaft; an intermediate gear meshing and movable with said slidable gear; means for moving said intermediate gear into mesh with either of said feed rod gears; and driving connections between said second spindle gear and said slidable gear.

18. The combination of a revoluble spindle; a driving pulley loosely mounted thereon; a gear revoluble therewith; a shaft parallel with said spindle adapted to actuate a thread milling cutter; means for rotating said shaft from the pulley gear; a gear on said shaft; a second shaft adapted to be rotated by the last mentioned gear; a third shaft adapted to actuate a relieving slide; driving connections between said second and third shafts; a gear secured to said spindle; a train of gears between said third shaft and spindle gear for rotating said spindle; a second gear rotatable with said spindle; a feed rod; a plurality of gears of different diameters thereon; a fourth shaft; a driving gear meshing and movable with said slidable gear; means for moving said intermediate gear into mesh with either of said feed rod gears; and driving connections between said second spindle gear and said slidable gear including interchangeable gears for varying the ratio of speed.

19. The combination of a revoluble spindle; a driving pulley loosely mounted thereon; a gear revoluble therewith; a shaft parallel with said spindle adapted to actuate a thread milling cutter; means for rotating said shaft from the pulley gear; a gear on said shaft; a second shaft adapted to be rotated by the last mentioned gear; a third shaft adapted to actuate a relieving slide; driving connections between said second and third shafts; a gear secured to said spindle; a train of gears between said third shaft and spindle gear for rotating said spindle, including two pairs of gears of different diameters, one pair of which is slidably mounted whereby either gear of the pair may mesh with a gear of the other pair.

20. The combination of a revoluble spindle; a driving pulley loosely mounted thereon; a gear revoluble therewith; a shaft parallel with said spindle; means for rotating said shaft from the pulley gear; a gear on said spindle adapted to be rotated by the last mentioned gear; a second gear on said spindle and rotatable therewith; a feed rod; a support movable about the axis of said feed rod; a train of gears mounted on said support and adapted to transmit rotary movement from the spindle to said feed rod; and means whereby said support may be moved about its pivot and locked in adjusted position.

21. The combination of a revoluble spindle; a driving pulley loosely mounted thereon; a gear revoluble therewith; a shaft parallel with said spindle; means for rotating said shaft from the pulley gear; a gear on said spindle adapted to be rotated by the last mentioned gear; a second gear on said spindle and rotatable therewith; a feed rod; a support movable about the axis of said feed rod; a slotted plate pivoted to said support; a stud adjustably mounted in a radial slot of said plate; a shaft adapted to actuate a relieving slide; a plurality of gears of different diameters keyed to and slidable on said relieving-slide-actuating shaft; a gear on said stud adapted to mesh with either of said plurality of gears; a pinion revoluble with said stud gear; a gear meshing with said pinion; a short shaft therefor; a gear on said shaft meshing with the spindle gear; and means whereby said plate may be moved about its pivot and locked in adjusted position.

22. The combination of a revoluble spindle; a driving pulley loosely mounted thereon; a gear revoluble therewith; a shaft parallel with said spindle; means for rotating said shaft from the pulley gear; a gear on said spindle adapted to be rotated by the last mentioned gear; a second gear on said spindle and rotatable therewith; a feed rod; a support movable about the axis of said feed rod; a slotted plate pivoted to said support; a stud adjustably mounted in a radial slot of said plate; a shaft adapted to actuate a relieving slide; a plurality of gears of different diameters keyed to and slidable on said relieving-slide-actuating shaft; a gear on said stud adapted to mesh with either of said plurality of gears; a pinion revoluble with said stud gear; a gear meshing with said pinion; a short shaft therefor; a gear on said shaft meshing with the spindle gear; an eccentric bushing in which said short shaft revolves; means for moving said bushing about its axis; and means whereby said plate may be moved about its pivot and locked in adjusted position.

23. The combination of a revoluble spindle; a driving pulley loosely mounted thereon; a shaft rotatable by said pulley through driving connections and adapted to actuate a thread milling cutter; a second shaft adapted to actuate a relieving slide; driving connections between said shafts; and means for rotating the spindle through driving connections from the second shaft.

24. The combination of a revoluble spindle; a driving pulley loosely mounted thereon; a shaft rotatable by said pulley through driving connections and adapted to actuate a thread milling cutter; a second shaft adapted to actuate a relieving slide; driving connections between said shafts; means for rotating the spindle through driving connections from the second shaft; a feed rod; and means for rotating said feed rod through driving connections from said spindle.

25. The combination of a revoluble spindle; a driving pulley loosely mounted thereon; driving connections between said pulley and spindle; a feed rod; means for rotating said feed rod through driving connections from said spindle; a spiral head; a shaft for actuating said spiral head; and means for actuating said spiral head shaft through driving connections from the feed rod.

26. The combination of a revoluble spindle; a driving pulley loosely mounted thereon; a shaft rotatable by said pulley through driving connections and adapted to actuate a thread milling cutter said driving connections including means for varying the speed; a second shaft adapted to actuate a relieving slide; driving connections between said shafts; and means for rotating the spindle through driving connections from the second shaft.

27. The combination of a revoluble spindle; a driving pulley loosely mounted thereon; a shaft rotatable by said pulley through driving connections and adapted to actuate a thread milling cutter; a second shaft adapted to actuate a relieving slide; driving connections between said shafts, said driving connections including means for varying the speed; means for rotating the spindle through driving connections from the second shaft; a feed rod; and means for rotating said feed rod through driving connections from said spindle.

28. The combination of a revoluble spindle; a driving pulley loosely mounted thereon; driving connections between said pulley and spindle; a feed rod; means for rotating said feed rod through driving connections from said spindle, said driving connections including means for varying the speed; a spiral head; a shaft for actuating said spiral head; and means for actuating said spiral head shaft through driving connections from the feed rod.

29. The combination of a revoluble spindle; a driving pulley loosely mounted thereon; a shaft rotatable by said pulley through driving connections and adapted to actuate a thread milling cutter; a second shaft adapted to actuate a relieving slide; driving connections between said shafts including means for varying the speed; and means for rotating the spindle through driving connections from the second shaft.

30. The combination of a revoluble spindle; a driving pulley loosely mounted thereon; a shaft rotatable by said pulley through driving connections and adapted to actuate a thread milling cutter; a second shaft adapted to actuate a relieving slide; driving connections between said shafts; means for rotating the spindle through driving connections from the second shaft; a feed rod; and means for rotating said feed rod through driving connections from said spindle, said driving connections including a plurality of mechansms for varying the ratio of speed.

31. The combination of a revoluble spindle; a driving pulley loosely mounted thereon; driving connections between said pulley and spindle; a feed rod; means for rotating said feed rod through driving connections from said spindle; a spiral head; a shaft for actuating said spiral head; and means for actuating said spiral head shaft through driving connections from the feed rod, said driving connections including a plurality of mechanisms for varying the ratio of speed.

32. The combination of a revoluble spindle; a driving pulley loosely mounted thereon; means actuated by said pulley for rotating said spindle; a feed rod; a support movable about the axis of said feed rod; means mounted on said support for rotating said feed rod including a rotatable shaft with a plurality of gears keyed thereto and slidable thereon; a second shaft adapted to be rotated by said spindle; a plurality of gears secured to and revoluble with said second shaft; and means for locking said support in adjusted position with either of one plurality of gears in mesh with either of the other plurality of gears.

33. The combination of a revoluble spindle; a driving pulley loosely mounted thereon; a shaft adapted to actuate a thread milling cutter and driven from said loose pulley; a shaft adapted to actuate a releiving slide; driving connections between said shafts; means for rotating said spindle by the rotation of the relieving-slide shaft; a feed rod; a support movable about the axis of said feed rod; means mounted on said support for rotating said feed rod including a rotatable shaft with a plurality of gears keyed thereto and slidable thereon; a second shaft adapted to be rotated by said spindle; a plurality of gears secured to and revoluble with said second shaft; and means for locking said support in adjusted position with either of one plurality of gears in mesh with either of the other plurality of gears.

34. The combination of a revoluble spindle; a driving pulley loosely mounted thereon; means actuated by said pulley for rotating said spindle; a feed rod; a pivoted support; means mounted on said support for rotating said feed rod including a rotatable shaft with a plurality of gears keyed thereto and slidable thereon; a second shaft adapted to be rotated by said spindle; a plurality of gears secured to and revoluble with said second shaft; and means for locking said support in adjusted position with either of one plurality of gears in mesh with either of the other plurality of gears.

35. The combination of a revoluble spindle; a driving pulley loosely mounted thereon; a shaft adapted to actuate a thread milling cutter and driven from said loose pulley; a shaft adapted to actuate a relieving slide; driving connections between said shafts; means for rotating said spindle by the rotation of the relieving-slide shaft; a feed rod; a pivoted support; means mounted on said support for rotating said feed rod including a rotatable shaft with a plurality of gears keyed thereto and slidable thereon; a second shaft adapted to be rotated by said spindle; a plurality of gears secured to and revoluble with said second shaft; and means for locking said support in adjusted position with either of one plurality of gears in mesh with either of the other plurality of gears.

36. The combination of a revoluble spindle; a driving pulley loosely mounted thereon; means actuated by said pulley for rotating said spindle; a feed rod; a support movable about the axis of said feed rod; means mounted on said support for rotating said feed rod including a rotatable shaft with a plurality of gears keyed thereto and slidable thereon; a second shaft adapted to be rotated by said spindle; a plurality of gears secured to and revoluble with said second shaft; means for locking said support in adjusted position with either of one plurality of gears in mesh with either of the other plurality of gears; a shaft adapted to actuate a relieving slide rotatable in bearings on said support; gears of different diameters thereon; and means carried by said support for transmitting rotary movement from said spindle to either of the gears on said relieving-slide shaft.

37. The combination of a revoluble spindle; a driving pulley loosely mounted thereon; a shaft adapted to actuate a thread milling cutter and driven from said loose pulley; a shaft adapted to actuate a relieving slide; driving connections between said shafts; means for rotating said spindle by the rotation of the relieving-slide shaft; a feed rod; a support movable about the axis of said feed rod; means mounted on said support for rotating said feed rod including a rotatable shaft with a plurality of gears keyed thereto and slidable thereon; a second shaft adapted to be rotated by said spindle; a plurality of gears secured to and revoluble with said second shaft; means for locking said support in adjusted position with either of one plurality of gears in mesh with either of the other plurality of gears; a shaft adapted to actuate a relieving slide rotatable in bearings on said support; gears of different diameters thereon; and means carried by said support for transmitting rotary movement from said spindle to either of the gears on said relieving-slide shaft.

Signed by me at 746 Old South Bldg., Boston, Massachusetts, this 16th day of April, 1923.

BERNARD A. BEHREND.

Witnesses:
WALTER E. LOMBARD,
NATHAN C. LOMBARD.